Patented July 29, 1952

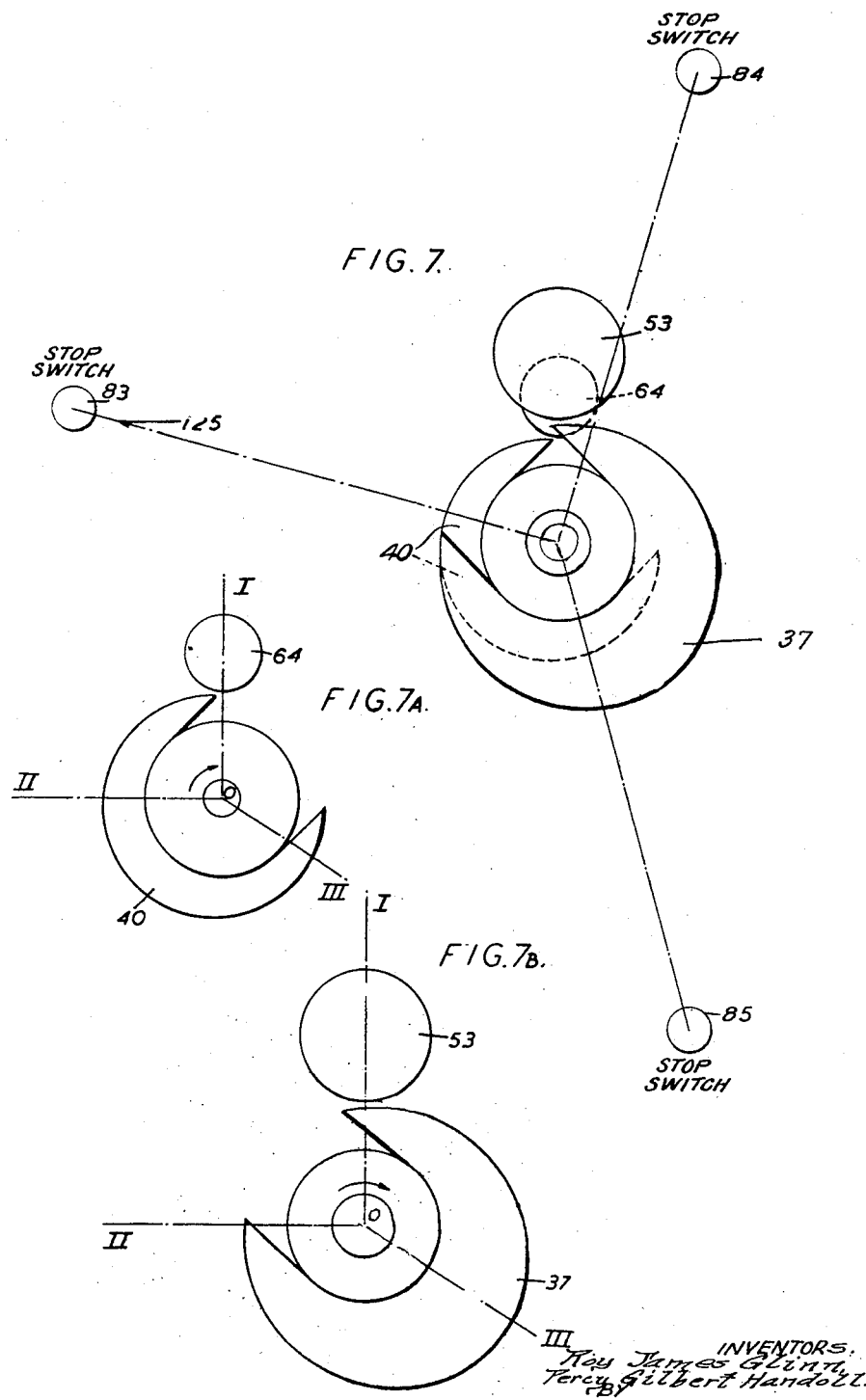

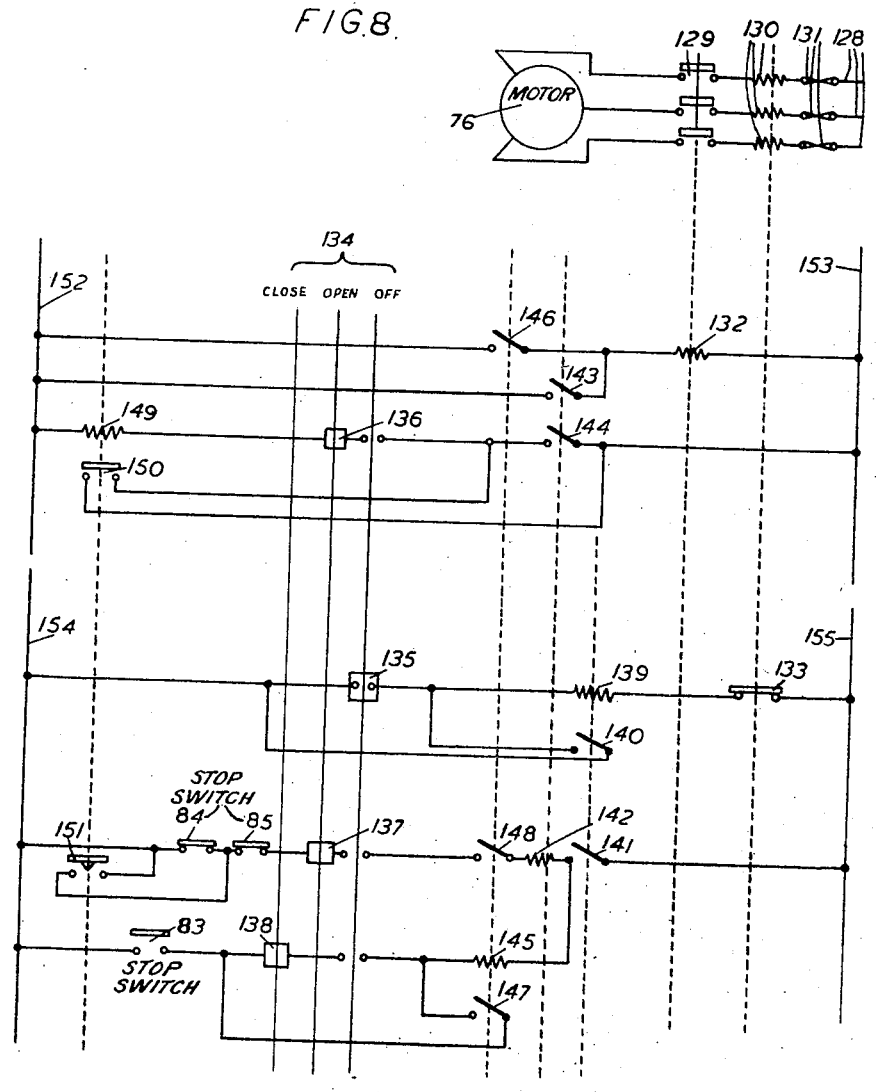

2,605,107

UNITED STATES PATENT OFFICE 2,605,107

MULTIPLE VALVE FLUID CONTROL APPARATUS

Roy James Glinn and Percy Gilbert Handoll, London, England, assignors to Diamond Power Specialty Corporation, a corporation of Ohio Application November 13, 1945, Serial No. 628,042

2 Claims. (Cl. 277—20)

This invention relates to fluid control apparatus and particularly to valves and their operation. In a power operated valve in which the movable valve element is operated by apparatus, including a threaded spindle and nut, driven by a power device such as an electric motor, it is necessary for the moving part of the power device to stop in closely defined positions corresponding to the positions to which the movable valve element is to be moved. If the part is not so stopped, mechanical shock or/and jamming of the parts may occur or the valve element may be incorrectly positioned. With the form of apparatus mentioned the power device must not only be started and stopped, it must also be reversed. In some instances a main valve and a by-pass valve are adapted together to control a fluid path, the by-pass valve serving to admit vapor to heat up a portion of the path before the main valve is opened, and in such case not only has the moving element of each valve to be correctly positioned, the elements must also be operated in correct sequence.

One object of the present invention is to provide for the power operation of main and by-pass valves in proper sequence and in such manner as to avoid danger of shock or jamming of the moving elements of the valves and to lessen or obviate the danger of incorrect positioning of the said elements. Another object of the invention is the provision of simple but effective operating gear for main and by-pass valves which facilitates the remote control of the valves. Another object is to provide an improved construction of main and by-pass valves.

The present invention includes fluid control apparatus comprising main and by-pass valves adapted to be power operated, control means arranged to be actuated by the power device and adapted to stop the power device at the termination of the opening movements of the movable elements of the valves and the closing movement of the movable element of the main valve and lost motion means included in the driving gear for actuating the movable elements of the valves and adapted to provide within limits freedom of movement of the movable part of a power device relatively to the movable parts of the valves while the latter are in their closed positions.

The invention also includes fluid control apparatus comprising main and by-pass valves disposed in a common casing and operating gear including a cam shaft rotatable through successive positions in which both valves are closed, the by-pass valve only is open and the main valve is open.

The invention will now be described, by way of example, with reference to the accompanying drawings in which:

Figure 1A is a fragmentary elevational view of the pusher cam for the stop switches;

Figure 1B is a fragmentary plan view of the pusher cam showing its contour;

Figure 2A is a fragmentary view of the clutch in disengaged position;

Figure 7 shows the angular relationship between cams and tappets for operating the main and by-pass valves and the three stop switches indicated diagrammatically, the cams being shown in starting and stopping positions;

Figure 7A shows the tappet roller and cam for operating the by-pass valve and indicates the approximate position of the cam relatively to the tappet roller for the starting and stopping condition, the by-pass valve open condition and the main valve open condition;

Figure 7B shows the tappet roller and cam for operating the main valve and indicates the approximate position of the cam relatively to the tappet roller for the starting and stopping condition, the by-pass valve open condition and the main valve open condition; and Figure 8 is a circuit diagram illustrating one method of controlling the electric motor.

Figure 1:
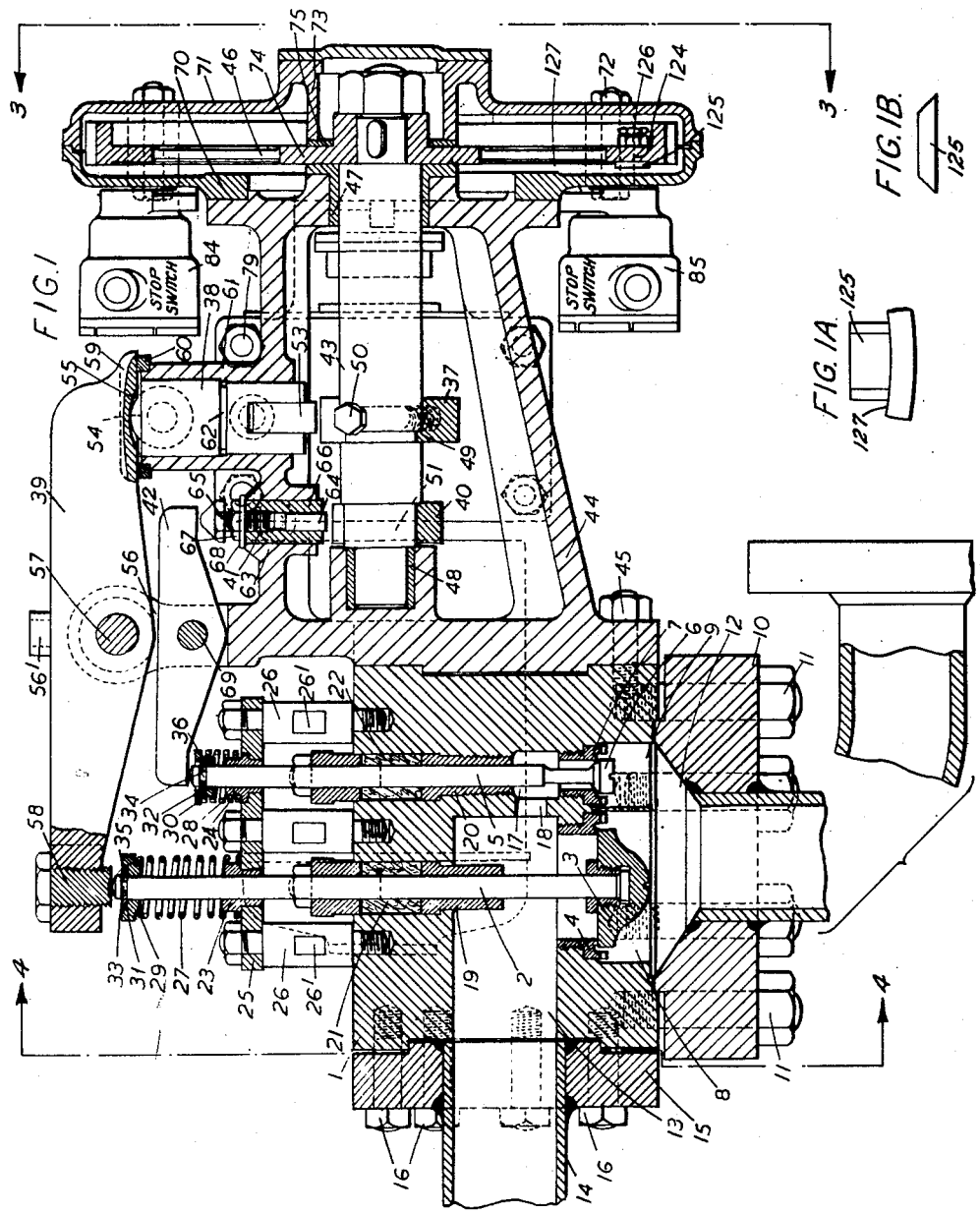
Figure 1 is a sectional side elevation of fluid control apparatus including a main valve and a by-pass valve arranged to be driven by an electric motor.

Referring to Figures 1 to 4, a six-sided forging 1 forms a casing both for the main valve and the by-pass valve which are in the form of lift valves and the former of which includes a valve spindle 2 carrying a movable valve disc 3 arranged to cooperate with a fixed valve seat 4 and the latter of which includes a valve spindle 5 carrying a movable valve disc 6 arranged to cooperate with a fixed valve seat 7. Below the valve seat 4 is a chamber 8 and below the valve seat 7 is a chamber 9 and an inlet pipe flange 10 clamped to the lower face of the forging 1 by studs and nuts 11 is formed with a bore flared at its inner end to form a common inlet chamber 12 in communication with the chambers 8 and 9. Above the valve seat 4 is an outlet chamber 13 presenting at the rear face of the forging 1 an opening with which registers an outlet pipe 14 secured to the forging by the pipe flange 15 and cooperating studs and nuts 16. Above the valve seat 7 is a chamber 17 in communication with the outlet chamber 13 through a port 18.

The valve spindles 2 and 5 are arranged respectively to slide through bushings 19 and 20 and stuffing boxes 21 and 22 carried by the forging 1 and through bushings 23 and 24 lining openings through a bridge-piece 25 mounted upon the forging 1 but spaced therefrom by pillars 26 having flat portions 26' for receiving a spanner. The valve discs 3 and 6 are biassed to their closed positions by compression springs 27 and 28 respectively acting between the bridge-piece 25 and seats 29 and 30 mounted on the upper ends of the valve spindles 2 and 5 and maintained in position on the spindles by U-shaped washers 31 and 32 engaged in annular grooves 33 and 34 in the spindles and in annular recesses 35 and 36 in the seats 29 and 30.

By compressing the spring 27 and removing the U-shaped washer 31, the valve spindle 2 may readily be released to permit withdrawal thereof. Similarly, by compressing the spring 28 and removing the U-shaped washer 32, the valve spindle 5 may readily be released to permit withdrawal thereof. Conveniently the pipe on which the flange 10 is formed is an elbow-piece flanged at both ends, and by removing the pipe and flange 10 access may be had to the interior of the forging 1 for the purpose of inspection, of withdrawing the spindles 2 and 5 with their discs 3 and 6, of lapping the discs to the fixed valve seats, or of renewing the fixed valve seats which are screwed into position in the forging.

It will be observed that when the valves are closed and fluid under pressure is admitted to the inlet chamber 12 the fluid pressure assists the springs 27 and 28 and serves to increase the contact pressures between the valve discs and the fixed valve seats.

When the fluid control apparatus is used to control hot steam, overheating of the springs 27 and 28 is avoided, since the bridge-piece 25 is spaced from the forging 1 by the pillars 26.

The main valve is arranged to be operated by a cam 37 operating through a tappet 38 and lever 39 and the by-pass valve is arranged to be operated by a cam 40 operating through a tappet 41 and lever 42, the tappets, levers and a shaft 43 carrying the cams being mounted on bracket 44 clamped by studs and nuts 45 to the front face of the forging 1.

Keyed and clamped to the front end of the shaft 43 is a spur wheel 46 and the bracket is fitted with bushings 47 and 48 within which the shaft is rotatably mounted. The cams 37 and 40 are shaped after the manner of a horse shoe and are readily accessible through the side of the bracket and the cam 37 is formed with an internal projection 49, which fits a corresponding annular groove in the shaft, and is clamped to the shaft by a screw 50 passing through a transverse bore in the shaft and screwing into the cam. The cam 40 fits a part 51 of the shaft of reduced diameter and is similarly clamped in position by a screw 52 passing through a bore in the shaft and screwing into the cam.

The tappet 38 is provided with a roller 53 for engagement with the cam 37 and with a roller 54 which is in engagement with a groove 55 on the underside of the lever 39 and which by engaging the sides of the groove prevents rotation of the tappet. The lever 39 is pivotally mounted between the forks 53 of the bracket 44 on a pin 57 and at its rear end engages the valve spindle 2 through an adjusting screw 58, whilst at its front end the lever is formed with an annular seating 59 adapted to engage a resilient washer 60 mounted on the top of the tappet guide 61 within which the tappet 38 operates. The inward movement of the tappet 38 is limited by engagement between an annular shoulder 62 on the tappet with a corresponding internal shoulder on the tappet guide.

The tappet 41 slides in a tappet guide 63 and is provided with a roller 64 for engagement with the cam 40. The tappet includes an outer headed part 65 arranged to engage the forward end of the lever 42 and to screw into an axial threaded bore in the inner part 66 carrying the roller 64, so that the effective length of the tappet is adjustable. A lock nut 67 serves to maintain the parts 65 and 66 in adjusted position and to clamp a washer 68 against the part 66. By engaging the outer end of the tappet guide 63 the washer 68 limits the inward movement of the tappet. A suitable key-way and key, not shown, are provided for preventing turning of the tappet 41 in the tappet guide 63. The lever 42 is pivoted below the lever 39 between the forks 56 on a pin 69.

It will be seen that by arranging the by-pass valve and its cam between the main valve and its cam, with the lever 42 below the lever 39, a compact disposition of the levers is obtained.

The forks 56 of the bracket are formed with bosses 56' having threaded bores whereby a cover plate (not shown) may be secured in position over the levers 39 and 42.

The spur wheel 46 and an associated driving pinion are enclosed in a casing including a base part 70 secured to the bracket 44 and a cover part 71 held on the base part by the bolts 72. The cover part 71 is formed with an annular inward projection 73, between which and the forward face of an inner portion 74 of the spur wheel is a washer 75 surrounding the hub of the spur wheel. It will be seen that the cam shaft 43 is positioned axially, since it is secured to the spur wheel and the latter is located between the bushing 47 and the washer 75.

The pinion cooperating with the spur wheel 46 is arranged to be driven by a unit including an electric motor 76 and speed reducing gear 77 operating through a clutch 78, the speed reducing gear being clamped by bolts 79 to a bracket 80 extending rearwardly from the base part 70 and supported by a spacing pillar 81 and clamping screw 82 from the bracket 44.

The spindle of the pinion is provided with means including a cross pin 78' whereby a driving handle may be inserted through an aperture in the cover part 71 and coupled with the pinion, and the clutch 78 is of known type in which placing a driving handle in operative position effects movement of a part of the clutch against a biassing spring to open the clutch.

Figure 2:
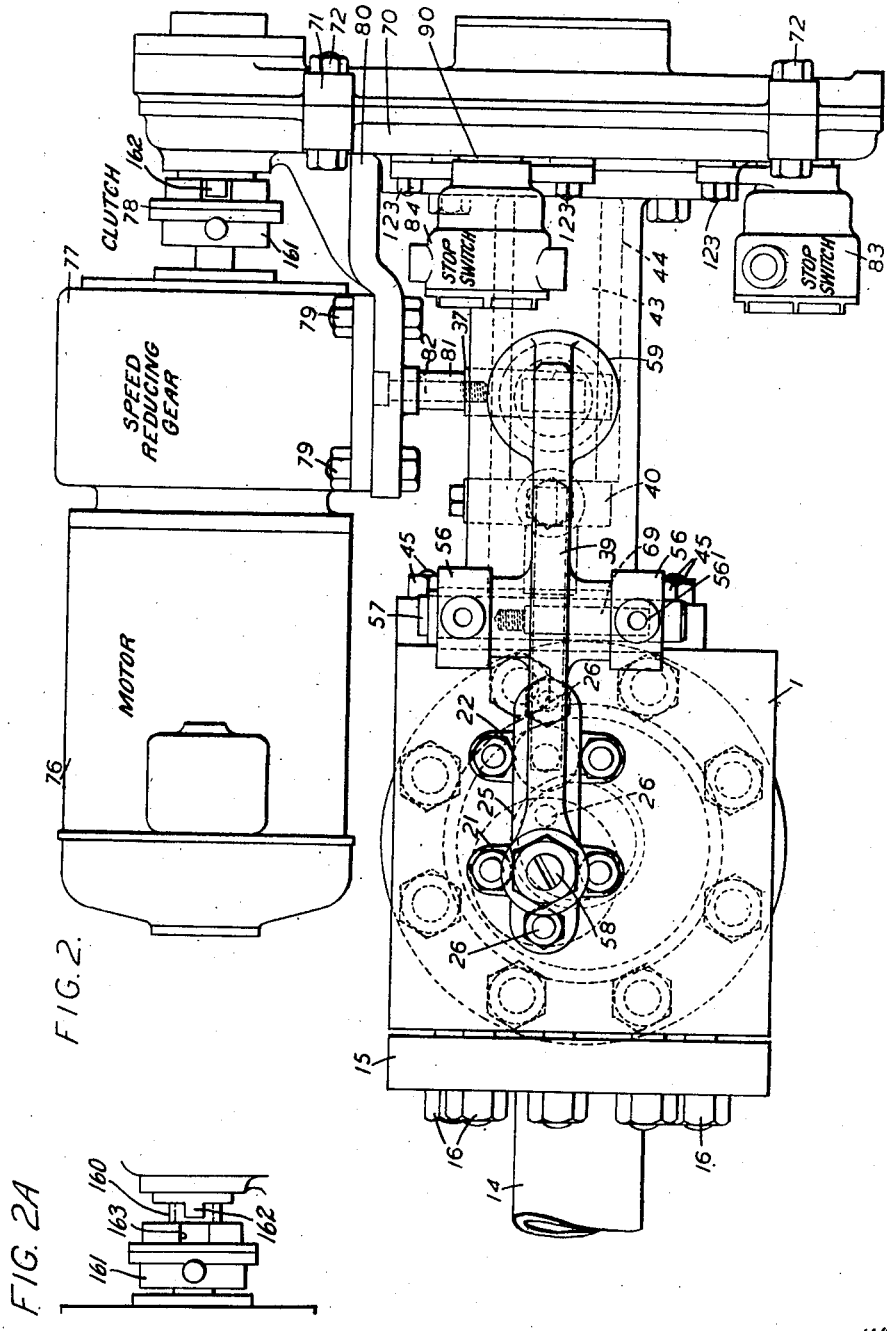
Figure 2 is a plan view of the apparatus.

This construction is illustrated in Figures 2 and 2A which show the clutch 78 in the engaged and disengaged positions respectively. When the end 160 of the handle is inserted in the aperture in cover part 71, the end of the handle pushes the slidable clutch part 161 to the left, disengaging clutch dog 162 from slot 163. Clutch part 161 is preferably keyed to the electric motor shaft, and a simple ball click arrangement (not shown) locates this clutch member in one position or the other, member 161 being manually movable from disengaged to engaged position. The handle is adapted to engage part 78' of the pinion spindle as it moves clutch element 161 to disengaged position.

The valve spindles 2 and 5, the levers 39 and 42, the tappets 38 and 41 and the cam shaft 43 are offset from the longitudinal centre line of the forging 1 towards the side thereof at which the driving motor 76 is mounted and the motor is spaced from the side of the forging. The motor 76, moreover, is positioned with its shaft well above the longitudinal centre line of the forging 1. By thus spacing the motor from the forging 1 and disposing it remotely from the inlet pipe flange 10, danger of overheating the motor when the control apparatus is used in connection with hot steam is reduced or obviated.

Figure 5:
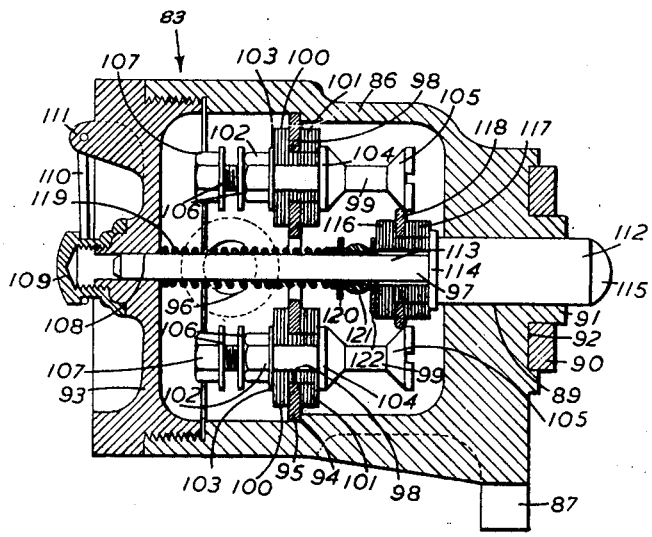
Figure 5 is a sectional side view, showing, to a larger scale than Figures 1 to 4, one of three similar stop switches for automatically stopping the electric motor.
Figure 6:
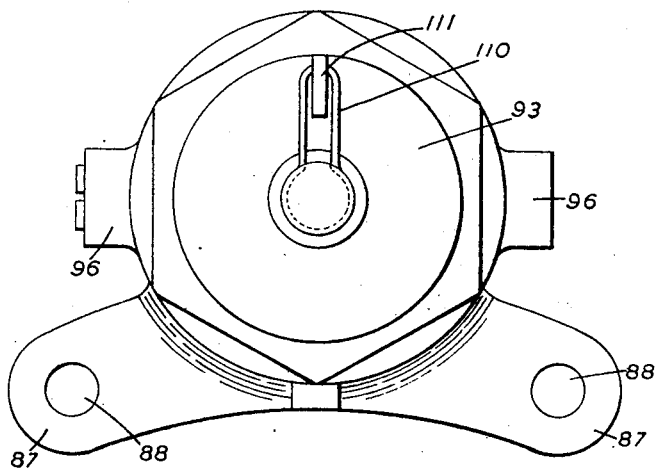
Figure 6 is an end view looking from the left of Figure 5.

Supported by the base part 70 of the casing enclosing the spur wheel and pinion are three similar stop switches 83, 84 and 85. As shown by Figures 5 and 6, each switch includes a casing 86 from which project lugs 87 formed with holes 88 for clamping studs. The base of casing 86 is provided with a bore 89 and a packing washer 90 fits around an annular projection 91 and within an annular recess 92 of the said base. The casing is closed by a cover 93 which screws onto the casing, and secured by screws (not shown) against an annular shoulder 94 within the casing is a contact mounting plate 95. Ducts 96 in the side of the casing permit the passage of electric cable to the switch terminals and the ducts are internally threaded so that one of the ducts may be closed by a plug.

The plate 95 is centrally apertured for the passage of a plunger 97 and is formed with apertures 98 for the passage of two contact and terminal rods 99 each of which is insulated from the plate 95 by an insulating bush 100 and an insulating washer 101 and is secured in position by a nut 102 screwing onto the rod and clamping the associated bush and washer between a metal washer 103 and a shoulder 104 formed on the rod. At its forward end each rod is formed with a contact 105 and at its rear end with washers 106 and nut 107 for securing an electrical conductor thereto.

The cover 93 is formed with a central bore 108 coaxial with the bore 89 and serving as a guide for the plunger 97. The rear end of the plunger 97 is covered by an inspection cap-nut 109 which may be rotated relatively to but is retained by an arm 110 hinged to the lug 111 on the cover. By unscrewing the cap-nut 109 the position and movements of the end of the plunger 97 may be observed.

The plunger 97 has a forward end 112 which slidably fits the bore 89, a part 113 of reduced diameter which slidably fits the bore 108 and an intermediate annular projection 114. The forward end 112 projects from the casing 86 and is formed with a rounded extremity 115. Mounted on and insulated from the part 113 by means of an insulating bush 116 and an insulating washer 117 is a contact disc 118, and a helical compression spring 119, having its opposite ends seated respectively against the cover 93 and a washer 120, acts on the insulating bush 116 through a collar 121 and washer 122. In this way the contact disc 118 is biassed to the closed position in which it bridges the fixed contacts 105 and, since the insulating bush 116 and insulating washer 117 are arranged to engage the annular projection 114, the spring also serves to position the plunger in a normal position shown in the drawings. Whilst the plunger is able to move outwardly beyond the normal position to a small degree, such outward movement is limited by engagement of the annular projection 114 with the base of the casing.

By pressing upon the rounded extremity 115 the plunger 97 may be pressed inwardly to move the contact disc 118 away from the fixed contacts 105.

At each of the locations where a switch 83, 84 or 85 is fitted, the base part 70 of the casing enclosing the spur wheel is formed with an aperture into which fits the annular projection 91 of the switch casing and with studs 123 for passing through the holes 88 in the lugs 87 and cooperating with associated clamping nuts.

The stop switches 83, 84 and 85 are positioned with the longitudinal axes of their plungers 97 on a circle having its centre on the longitudinal axis of the cam shaft 43, and secured to the outer part 124 of the spur wheel 46 so as to lie on the same circle is a cam or pusher 125, shown in detail in Figures 1A and 1B. Suitably the pusher 125 is clamped in position by a stud projecting therefrom, passing through the part 124 and cooperating with nuts 126. Rotation of the pusher relatively to the spur wheel is prevented, since the radially outer face of the pusher conforms to and engages part of the radially inner face of the annular shoulder 127 of the spur wheel. The pusher is formed with a cam face adapted by engaging the rounded end 115 of the plunger 97 of the stop switch 83, 84 or 85 to press the plunger inwardly against the bias of the spring 119 and thereby open the switch.

Figure 3:
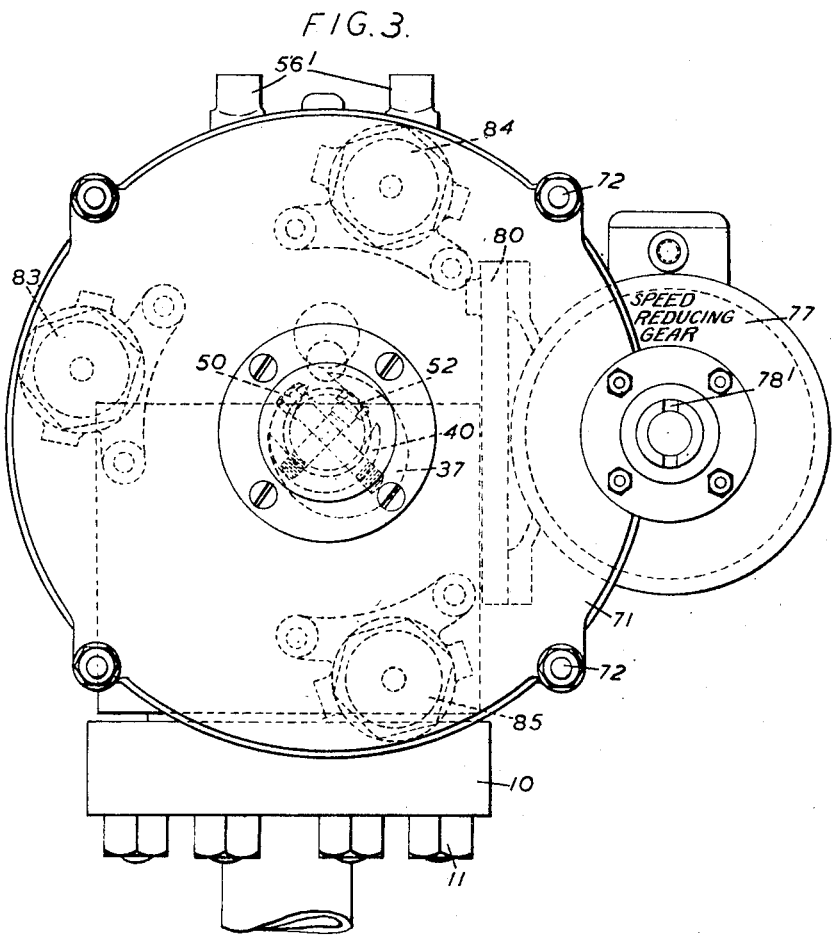
Figure 3 is an end view taken along the line 3—3 looking from the right of Figure 1.
Figure 4:
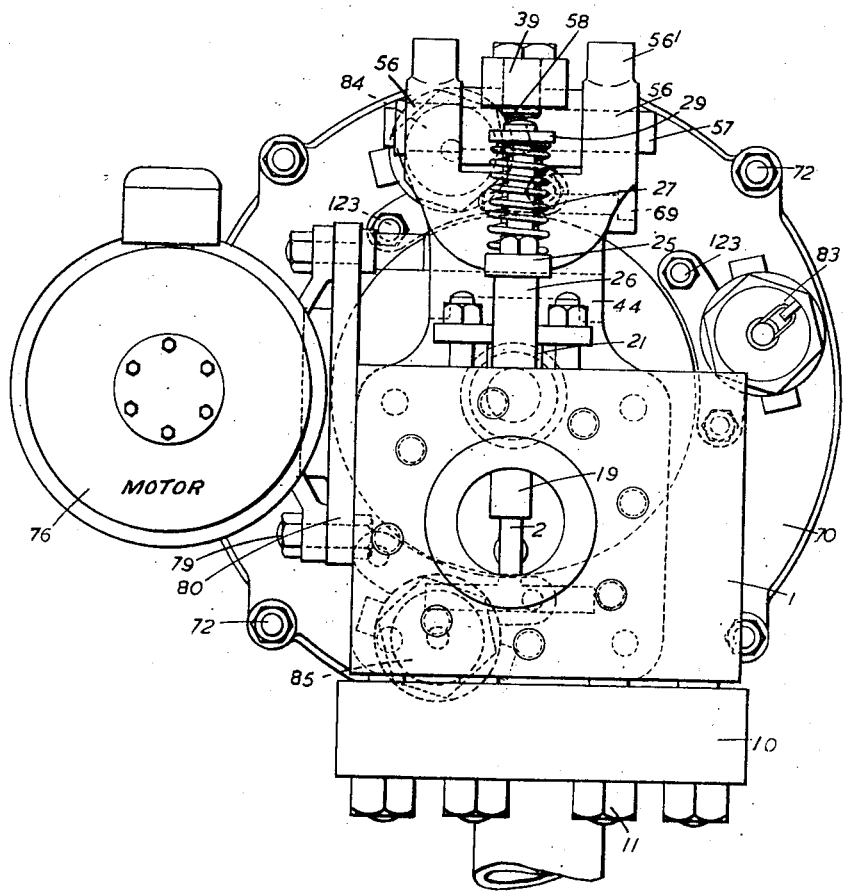
Figure 4 is an end view taken along the line 4—4 looking from the left of Figure 1 with the outlet pipe and its flange removed.

The main and by-pass valves are adapted to be opened and closed in desired sequence by unidirectional rotation of the motor 76 or of the handle coupled to the spindle of the pinion, and the cams are designed to provide lost motion whereby the rotor of the motor has freedom of movement within limits while the valves are in their closed positions. Actually each cam is of horseshoe shape as shown in Figure 3 so that when the cooperating tappet is in a position corresponding to the open or the closed position of the associated valve, the cam shaft may be rotated forwardly through a substantial angle without affecting the position of the tappet, since the roller follower is between the arms of the horseshoe.

In Figures 7, 7A and 7B the cam 37 and the cam 40 are shown in their start and stop positions in which the lines 0—1 of Figures 7A and 7B, assumed fixed relatively to the cams, cut the axes of the tappet rollers 64 and 53 shown in the positions occupied when the main and by-pass valves are closed. The stop switches 83, 84 and 85 are diagrammatically illustrated in Figure 7 and it will be observed that the switch 84 is displaced from the switch 83 in a clockwise direction through an angle of 90° and that the switch 85 is displaced from the switch 84 in a clockwise direction through an angle of 150°. When the cams 37 and 40 are in their start and stop positions the pusher 125 is opposite the stop switch 83 so that the contacts of that switch are open. The parts of the cams below the tappet rollers when the cams have rotated in a clockwise direction to their by-pass open positions are shown by the lines 0—II of Figures 7A and 7B and the parts of the cams below the tappet rollers when the cams have rotated in a clockwise direction to their main valve open positions are shown by the lines 0—III of Figures 7A and 7B. The lines 0—II are displaced by angles of 90° from the lines 0—I and the lines 0—III are displaced by angles of 150° from the lines 0—II.

It will be seen that when the cams 37 and 40 are in their start and stop positions they are out of contact with the tappet rollers 53 and 64 respectively. In operation, when the cam shaft 43 is rotated, the pusher 125 moves away from the stop switch 83 and the contacts of the latter close. Also the cam 40 engages the tappet roller 64 and acts to move the by-pass valve towards its open position until, in the by-pass valve open positions of the cams, the line 0—II cuts the axis of the tappet roller 64, when the by-pass valve is fully open and the pusher 125 opens the contacts of the stop switch 84. The opening of the switch contacts may be utilized in suitable manner to stop the electric motor.

When the cam 40 is in the by-pass valve open position, the cam is still out of contact with the tappet roller 37, but when the rotation of the cam shaft is resumed the pusher 125 moves away from the stop switch 84 so that the contacts of that switch reclose, and the cam 37 engages the tappet roller 53 and acts to move the main valve towards its open position until, in the main valve open position of the cam, the line 0—III cuts the axis of the tappet roller 53, when the main valve is fully open and the pusher 125 opens the contacts of the stop switch 85. The opening of the switch contacts may be utilized in suitable manner to stop the electric motor. The cam 40 is so shaped that during the latter part of the movement from the by-pass valve open position to the main valve open position the by-pass valve recloses.

When the rotation of the cam shaft is restarted, the pusher 125 moves away from the stop switch 85 so that the contacts of that switch reclose, and movement of the cam 37 permits the tappet roller 53 to move towards the valve closed position until the main valve has reclosed. When the cams reach their start and stop positions in which the lines 0—I cut the axes of the tappet rollers, the pusher 125 effects reopening of the contacts of the stop switch 83 and the reopening of the switch contacts may be utilized in suitable manner to stop the electric motor.

It will be appreciated that the opening of the main valve is facilitated on account of the reduced pressure drop across the valve disc 3 consequent on the opening of the by-pass valve. The latter is readily opened on account of the relatively small size of the valve disc 6.

When the cams are rotated from their start and stop positions the cam shaft rotates through an angle sufficient to enable the driving motor to run up to speed before the cam 40 engages the tappet roller 64 and commences to exert a thrust thereon. The profile of the cam 40 is such that by the by-pass valve is maintained fully open until the cam shaft has rotated through nearly 100° from the by-pass valve open position and the cam 37 engages the tappet roller 53 only when the cam shaft has rotated about 25° from the by-pass valve open position, so that after the cam shaft has reached the by-pass valve open position the motor is able to rotate to a considerable degree without affecting the position either of the valve spindle 5 or the valve spindle 2. Such latitude also enables the driving motor to run up to speed before commencing to open the main valve when the cam shaft is rotated from the by-pass valve open position. The profile of the cam 37 is such that it may be moved forwardly from the main valve closed position through a substantial angle without accompanying movement or appreciable movement of the valve spindle 2 and, since the by-pass valve has already closed, the motor is again able to rotate to a substantial extent after having driven the cam shaft to the main valve open position without affecting the position of the valve spindle 5 and without affecting or appreciably affecting the position of the valve spindle 2. When the cam shaft reaches the start and stop position and the motor is de-energized, the motor is able to rotate to a considerable degree without absorbing the whole of the last motion provided between the cam 40 and the tappet roller 64, so that when the motor is restarted it is able to run up to speed before commencing to reopen the by-pass valve.

It will be seen, therefore, that we have provided in the driving gear for actuating the movable elements of the main and by-pass valves lost motion means adapted to provide within limits freedom of movement of the movable part of the motor relatively to the movable parts of the valves while the latter are in their closed positions and that we have also provided means for enabling movements within substantial limits of the movable part of the motor to take place while the valves remain in or substantially in their open positions.

Since the sequential operation of the valves is achieved by unidirectional rotation of the cam shaft, reversal of the motor is unnecessary and control thereof is facilitated. Remote control may be carried out in a simple fashion by utilizing the stop switches to stop the motor when the cam shaft reaches the appropriate angular position.

In Figure 8 the electric motor 76 may be connected to the three phase power supply 128 through a contactor 129, the coils 130 of an overload relay and the fuses 131. The contactor is provided with a closing coil 132 and the overload relay includes a normally closed contact 133.

A controller 134 is provided with a rotary element including segments 135, 136, 137 and 138, the segment 135 bridging associated contacts when, as shown, the rotary element is in the "off" position; the segments 136 and 137 respectively bridging associated contacts when the rotary element is in the "open" position; and the segment 138 bridging associated contacts when the rotary element is in the "close" position.

In addition, there are provided four relays, a relay including a coil 139 and normally open contacts 140 and 141; a relay including a coil 142 and normally open contacts 143 and 144; a relay including a coil 145, normally open contacts 146 and 147 and normally closed contact 148; and a relay including a coil 149 and normally open contacts 150 and 151, of which the contact 150 operates without a time delay and the contact 151 is adapted, in known manner, to close with a suitable time delay. The time delay can be effected for example by a self-starting electric clock mechanism which is part of the time delay switch. Such mechanisms are well known and commercially available.

The cam shaft is assumed to be in the start and stop position so that the stop switch 83 is open and the stop switches 84 and 85 are closed.

The contactor coil and the relay coils are connected in the manner shown in relation to low voltage alternating bus-bars 152 and 153 and low voltage direct current bus-bars 154 and 155.

In service, when, as shown, the rotary element of the controller is in the "off" position and the bus-bars 154 and 155 are energized, current flows between the bus-bars through segment 135, relay coil 139 and overload relay contact 133, so that the contacts 140 and 141 close. The contact 140 makes a maintaining circuit for the coil 139 to keep the coil energized when the rotary element is moved from the "off" position.

When the rotary element of the controller is moved to the "open" position, current flows between the bus-bars 154 and 155 through the stop switches 84 and 85, segment 137, relay contact 148, relay coil 142 and relay contact 141, with the result that the relay contacts 143 and 144 close.

Upon closure of the relay contact 143, current flows between the bus-bars 152 and 153 through that contact and the contactor coil 132. The contactor 129 therefore closes, the motor 76 commences to drive the cam shaft 43 and when the cam shaft has rotated through a small angle the stop switch 83 closes.

Upon closure of the relay contact 144, current flows between the bus-bars 152 and 153 through the coil 149, segment 136 and contact 144. The time delay contact 151 therefore commences to close and the contact 150 closes and makes a maintaining circuit for the coil 149 in parallel with the contact 144.

When the cam shaft 43 reaches the by-pass valve open position the pusher 125 opens the switch 84, with the result that the relay coil 142 is deenergized, the relay contacts 143 and 144 reopen, the contactor coil 132 is deenergized, the contactor 129 opens and the motor 76 stops.

Upon completion of the predetermined time delay, the relay contact 151 closes so that current flows between the bus-bars 154 and 155 through the contact 151, stop switch 85, segment 137, relay contact 148, coil 142 and relay contact 141, with the result that the relay contacts 143 and 144 are again closed, the contactor coil 132 is energized and the contactor 129 recloses. The motor 76 therefore drives the cam shaft 43 and after rotating through a small angle the pusher 125 permits the stop switch 84 to reclose. The rotation is continued until the cam shaft reaches the main valve open position, whereupon the pusher opens the stop switch 85, with the result that the relay coil 142 is deenergized, the relay contacts 143 and 144 open, the contactor coil 132 is deenergized, the contactor 129 opens and the motor 76 stops.

The rotary element of the controller may now be moved to the "off" position, with the result that the relay coil 149 is deenergized and the relay contacts 150 and 151 open.

When the main valve is to be closed, the rotary element of the controller is moved to the "close" position, when current flows between the bus-bars 154 and 155 through stop switch 183, segment 138, relay coil 145 and relay contact 141, with the result that relay contact 148 opens and relay contacts 146 and 147 close. Closure of the relay contact 147 serves to maintain the circuit of the relay coil 145 in the event of the rotary element of the controller being moved from the "close" position; opening of the relay contact 148 prevents energization of the relay coil 149 in the event of the rotary element of the controller being turned to the "open" position; and closure of the relay contact 146 effects energization of the contactor coil 132 so that the contactor 129 closes and the motor drives the cam shaft 43. When the cam shaft has rotated through a small angle from the main valve open position the stop switch 84 closes and when the cam shaft reaches the start and stop position the pusher 125 opens the stop switch 83, with the result that the relay coil 145 is deenergized, the relay contact 148 closes, the relay contacts 146 and 147 open, the contactor coil 132 is deenergized, the contactor 129 opens and the motor 76 stops.

If during operation of the motor the overload relay contact 133 opens, the relay coil 139 is deenergized and the contacts 140 and 141 open. Then the rotary element of the controller must be moved to the "off" position in order to energize the relay coil 139 through the segment 135 and overload relay contact 133 before the motor 76 can be reenergized.

The apparatus described above may be used in conjunction with a number of fluid heater cleaners adapted to be automatically controlled and operated in sequence for the purpose of cleaning the fluid heating surfaces of a steam generating installation, the apparatus being utilized to control the flow of steam for heating piping leading to the fluid heater cleaners, in order to avoid excessive condensation in the piping at the commencement of the blowing operation, and subsequently to control the flow of steam to the fluid heater cleaners during the blowing operation.

When the apparatus is used in the manner indicated, a stop valve is opened to allow the escape of condensate and steam from the piping to be heated and the rotary element of the controller is moved to the "open" position so that the motor 76 drives the cam shaft 43 until the by-pass valve is opened when the motor is automatically stopped. Upon opening of the by-pass valve, steam flows therethrough in limited amount sufficient to effect the required heating of the piping.

The time delay with which the relay contact 151 operates is adapted to ensure that the piping is sufficiently heated before the main valve is opened. Upon closure of contact 151 the motor is restarted and operates until the main valve is open when the motor is automatically stopped.

At the termination of the blowing operation the rotary element of the controller is turned to the "close" position, and the motor is restarted and runs until it is automatically stopped with the cam shaft in the start and stop position.

We claim:

1. In a multiple valve construction adapted to be power operated to control the flow of steam or the like, a valve casing having a chamber therein and having inlet and outlet openings communicating with said chamber and arranged at right angles to one another with the axes of said openings in a common plane, valving means for controlling the flow of fluid from the inlet opening to the outlet opening through said chamber including a plurality of valves movable in lines lying in a plane parallel to but laterally offset from the common plane of the axes of said inlet and outlet openings, whereby said valves may be disposed closer to one side of said casing than the other, and actuating means for said valves including a driving member supported by said casing and extending beside said closer side of the casing.

2. Means as set forth in claim 1 including a shaft carried by said casing and projecting therefrom in a line within the plane containing the lines of movement of the valves, said actuating means including mechanical transmission means operatively connected to said driving member and said valves, and common supporting means carried by said casing and supporting said shaft, transmission means and driving member.

ROY JAMES GLINN.
PERCY GILBERT HANDOLL.

REFERENCES CITED

The following references are of record in the file of this patent:

UNITED STATES PATENTS

| Number | Name | Date |
|---|---|---|
| 499,843 | Meady | June 20, 1893 |
| 999,321 | Leach | Aug. 1, 1911 |
| 1,141,503 | Street | June 1, 1915 |
| 1,372,244 | Paske | Mar. 22, 1921 |
| 1,688,391 | Magazzini | Oct. 23, 1928 |
| 1,726,211 | Bridgens | Aug. 27, 1929 |
| 1,755,639 | Fawcett | Apr. 22, 1930 |
| 1,784,125 | Wilson | Dec. 9, 1930 |
| 1,791,012 | Ray | Feb. 3, 1931 |
| 1,907,671 | Robinson | May 9, 1933 |
| 2,002,761 | Armstrong | May 28, 1935 |
| 2,297,418 | Koller | Sept. 29, 1942 |
| 2,375,517 | Blauvelt | May 8, 1945 |

FOREIGN PATENTS

| Number | Country | Date |
|---|---|---|
| 22,180 | Denmark | June 11, 1917 |
| 407,841 | Great Britain | Mar. 29, 1934 |